United States Patent [19]

Keating

[11] 4,119,605

[45] Oct. 10, 1978

[54] SOLUTIONS OF POLYESTER-IMIDES

[75] Inventor: John T. Keating, Clifton Park, N.Y.

[73] Assignee: Schenectady Chemicals, Inc., Schenectady, N.Y.

[21] Appl. No.: 846,392

[22] Filed: Oct. 28, 1977

Related U.S. Application Data

[62] Division of Ser. No. 770,310, Feb. 22, 1977.

[51] Int. Cl.$^2$ .............................................. C08K 5/06
[52] U.S. Cl. ...................... 260/33.2 R; 260/33.4 R; 260/857 PG; 528/170; 528/289; 528/296; 528/301
[58] Field of Search ............ 260/33.2 R, 33.4 R, 260/47 C, 75 R, 75 N, 857 PG

[56] References Cited

U.S. PATENT DOCUMENTS

| | | | |
|---|---|---|---|
| 3,382,203 | 5/1968 | Rating et al. | 260/75 N X |
| 3,676,403 | 7/1972 | Dobbelstein et al. | 260/75 R X |
| 3,853,817 | 10/1974 | Weddleton | 260/75 N |
| 3,929,714 | 12/1975 | Schmidt et al. | 260/75 N X |

FOREIGN PATENT DOCUMENTS

| | | | |
|---|---|---|---|
| 50-150,737 | 12/1975 | Japan | 260/75 R |
| 51-16,342 | 2/1976 | Japan | 260/75 R |

*Primary Examiner*—Lucille M. Phynes
*Attorney, Agent, or Firm*—Cushman, Darby & Cushman

[57] ABSTRACT

Polyester-imide resins are prepared which are soluble in non-phenolic solvents by incorporating a monoether of a diethylene glycol or triethylene glycol into the resin.

30 Claims, No Drawings

SOLUTIONS OF POLYESTER-IMIDES

This is a division of application Ser. No. 770,310 filed Feb. 22, 1977.

It is known to make polyester and polyester-imide wire enamels in which the polymer is soluble in a solvent comprising a large amount of a phenolic solvent, e.g., phenol, cresol or cresylic acid. Thus, see Weddleton U.S. Pat. No. 3,853,817, Schmidt U.S. Pat. No. 3,852,246, Meyer U.S. Pat. No. 3,426,098, Schmidt U.S. Pat. No. 3,562,219, Sattler U.S. Pat. No. 3,668,175, Schmidt U.S. Pat. No. 3,697,471, Schmidt U.S. Pat. No. 3,793,250, Schmidt U.S. Pat. No. 3,839,264 and Schmidt U.S. Pat. No. 3,929,714. The use of phenolic solvents is disadvantageous because of their relatively high toxicity and objectionable odor and the consequent problems in recovering them after application of the enamel to the wire. In Weddleton and Meyer there is mentioned the use of N-methyl pyrrolidone as a solvent. This solvent also is objectionable to some extent because of its noxious odor.

It has been proposed in Ito Japanese published application 49-59478 to prepare polyester resins of low molecular weight and then dissolve them in monoalkyl ethers of diethylene glycol and triethylene glycol to make wire enamels. Similarly in Okada Japanese published application 51-16342 it has been proposed to prepare polyester resins of low molecular weight and then dissolve them in monoalkyl ethers of mono, di or triethylene glycol or mono, di or tripropylene glycol. Neither Ito nor Okada attempted to react the monoalkyl ether of the polyalkylene glycol in forming the polyester nor in preparing products from polyester-imides. As the monoalkyl ether of the polyalkylene glycol can act as a monofunctional alcohol it can be seen that to add it prior to formation of the polyester would result in a modification of the product formed with attendant unpredictable properties.

Also it is known that polyester-imides have different properties than polyesters. Thus, when a low molecular weight polyester-imide is made in a manner somewhat analogous to that of the aforementioned Ito and Okada published Japanese applications, the product is not readily soluble in the monomethyl ethyl of diethylene glycol (Methyl Carbitol) alone, but is soluble in a mixture of Methyl Carbitol and N-methyl pyrrolidone. It also has been found that the monoethyl ether of diethylene glycol and the monobutyl ether of diethylene glycol do not act as solvents for polyester-imides, another difference from the reported results with polyesters.

It has now been found that novel polyester-imides can be prepared which are soluble in non-toxic solvents such as Methyl Carbitol if during the formation of the polyester imide there is employed as a reactant either an ether of the formula:

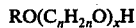

$$RO(C_nH_{2n}O)_xH$$

where R is an alkyl group of 1 to 6 carbon atoms or phenyl, n is 2 or 3 and x is 2 or 3 or the monophenyl ether of ethylene glycol or mixtures of such monoethers. Examples of such monoethers where R is as defined above are monomethyl ether of diethylene glycol, monomethyl ether of triethylene glycol, monomethyl ether of dipropylene glycol, monomethyl ether of tripropylene glycol, monoethyl ether of diethylene glycol, monoethyl ether of triethylene glycol, monoethyl ether of dipropylene glycol, monoethyl ether of tripropylene glycol, monoisopropyl ether of diethylene glycol, monoisopropyl ether of triethylene glycol, monoisopropyl ether of dipropylene glycol, monoisopropyl ether of tripropylene glycol, monopropyl ether of diethylene glycol, monobutyl ether of diethylene glycol, monobutyl ether of triethylene glycol, monobutyl ether of dipropylene glycol, monobutyl ether of tripropylene glycol, monohexyl ether of diethylene glycol, monohexyl ether of triethylene glycol, monohexyl ether of dipropylene glycol, monophenyl ether of diethylene glycol, monophenyl ether of tripropylene glycol. More preferably R is alkyl of 1 to 4 carbon atoms, most preferably methyl or ethyl. The presently preferred compound is the monomethyl ether of diethylene glycol.

The parameters of the development are as follows:
1. A polyester-imide made with a hydroxy to carboxyl ratio of 1.25:1 to 2:1, preferably 1.8:1 to 2:1.
2. Polyester to polyimide groups within the conventional range, e.g., 95 to 50% by weight polyester groups and 5 to 50% by weight polyimide groups, preferably 85 to 65% polyester groups and 15 to 35% polyimide groups.
3. The polyester-imide is made with 5 to 40% or even up to 45% of the hydroxyl groups being present as the glycol monoether of the type set forth above, more usually 5 to 30%, and more preferably 5 to 20% of the hydroxyl groups being present as the glycol monoether, most preferably 5 to 12% being present as the glycol monoether.
4. While the modified polyester-imides of the present invention are soluble in a wide variety of solvents including phenols, e.g., phenol per se, cresol or cresylic acid, they are preferably dissolved in a solvent containing 40% to 100% of diethylene glycol monoalkyl or phenyl ether or triethylene glycol monoalkyl or phenyl ether of the type set forth above, most preferably 50 to 100% of such monoalkyl ether of a diethylene glycol. When a cosolvent is used it can be, for example, N-methyl pyrrolidone or aliphatic hydrocarbons, e.g., octane, decane, dodecane, but more preferably is an aromatic hydrocarbon such as benzene, toluene, xylene, monoalkyl benzenes boiling in the range 315°–350° F. (Solvesso 100), a mixture of tetramethyl benzene with dialkyl and trialkyl benzenes boiling in the range 360°–400° F. (Solvesso 150), a blend of 70% Solvesso 150 with 30% heavy aromatic naphtha (the blend being known as Solvesso N-150), or the like. The solvent can be 100% monoalkyl or phenyl ether of diethylene glycol or triethylene glycol, or the phenyl ether of ethylene glycol. Also there can be used the monophenyl ether of ethylene glycol, alone or in combination with a monoalkyl or phenyl ether of diethylene glycol or triethylene glycol. Preferably the solvent is essentially free of phenolic solvents.
5. The monoether modified polyester-imide normally has an average molecular weight of from 500 to 1500, e.g., 500 to 1200, usually 550 to 1200, prior to being dissolved in the solvent. The modified polyester-imide is of sufficiently low molecular weight that it can be dissolved in a mono lower alkyl ether of diethylene glycol or in the phenyl ether of either diethylene glycol or ethylene glycol.
6. The polyester-imide is made using (1) a trifunctional polyol such as tris(2-hydroxyethyl)isocyanurate (THEIC), glycerine, trimethylolethane or trimethylol propane, (2) a dibasic acid such as isophthalic acid, terephthalic acid or benzophenone dicarboxylic acid or their lower alkyl esters, e.g., dimethyl terephthalate dimethyl isophthalate or dibutyl terephthalate, (3) trimellitic anhydride (TMA), (4) a diamine, preferably an aromatic diamine, e.g., methylene dianiline, oxydianiline, 2,4-tolylene diamine, 2,6-tolylene diamine, benzidine, 3,3'-diaminodiphenyl, 1,4-diaminonaphthalene, p-phenylene diamine, α'ω-nonamethylene diamine, 4,4'-diaminodiphenyl ether, 4,4-dimethyl heptamethylene diamine-1,7, diaminodiphenyl ketone, bis-(4-aminophenyl)-α,α'-p-xylene, m-phenylene diamine, xylene diamine, hexamethylene diamine, ethylene diamine, 4,4'-dicyclohexylmethane diamine or diaminodiphenyl sulfone. The preferred diamines are first methylene dianiline and second oxydianiline or tolylene diamine. Optionally there can be present a dihydric alcohol such as ethylene glycol, neopentyl glycol, butanediol-1,4, butanediol-1,3,1,4-cyclohexane dimethanol, 2,2,4-trimethyl-1,3-pentenediol, propylene glycol, diethylene glycol, trimethylene glycol, hexanediol-1,6 and dipropylene glycol. Up to 10 molar % of the aromatic dicarboxylic acid can be replaced by an aliphatic dicarboxylic acid such as adipic acid, sebacic acid, azelaic acid or the like. The preferred trihydric alcohol is THEIC, the preferred aromatic dibasic acid is terephthalic acid.

7. The amount of THEIC or other trihydric alcohol component is at least 20% or more preferably 30% of the total alcohol on an equivalent basis and it and the glycol monoether together can be 100% of all of the alcohol component although usually there is present some dihydric alcohol, e.g., in an amount of at least 10% of the total weight of the alcohols.

The hydroxyl number of polyester imides frequently is within the range of 180 to 270, but this can be varied, e.g., it can be as low as 150 or as high as 350 or 400.

The acid number of the products is usually below 6.

The use of the monoether of a glycol as a reactant which serves as a monofunctional alcohol serves to control the molecular weight and solubility of the polymer and permits the manufacture of wire enamels which contain relatively non-toxic solvents in place of phenols and also permits the attainment of enamels having economical high solids contents.

Thus, the modified polyester-imide resins of the invention can be dissolved in 100% methyl Carbitol or 100% monomethyl ether of triethylene glycol, or 100% butyl Carbitol, or a mixture of the monophenyl ether of ethylene glycol and the monophenyl ether of diethylene glycol or a mixture of methyl Carbitol with the ethyl ether of diethylene glycol (Carbitol) to give enamels having a solids concentration of 30 to 70%, preferably 45 to 55%. As indicated above aromatic hydrocarbon diluents can be added. The diluents do not increase the solubility but reduce the overall cost of the solvent.

There can be added to the wire enamels of the invention conventional modifiers such as titanates, such as tetraisopropyl titanate, tetrabutyl titanate, tetraphenyl titanate, dibutyl triethanolamine titanate, tetrahexyl titanate, tetramethyl titanate, etc., as well as polyisocyanates, e.g., Mondur SH which is the cyclic trimer of 2,4 and 2,6-tolylene diisocyanates having the three free isocyanate groups blocked by cresol and the other polyisocyanates mentioned in the Meyer patent set forth above, or metal driers, e.g., cobalt naphthenate, zinc resinate, zinc octoate, cadmium linoleate, zinc naphthenate. Also there can be added to the enamel resins such as melamine-formaldehyde resin or phenolic resins such as phenol-formaldehyde, cresol-formaldehyde and xylenol-formaldehyde resins.

The wire enamels can be applied to copper, silver, aluminum or other wires using conventional coating procedures and wire speeds and curing the wire is carried out at conventional temperatures, e.g., 500° to 900° F., usually 500° to 800° F.

The composition can comprise, consist essentially of or consist of the materials set forth.

Unless otherwise indicated all parts and percentages are by weight.

The following abbreviations are used in the examples:

| TA    | = | terephthalic acid              |
|-------|---|--------------------------------|
| DMT   | = | dimethyl terephthalate         |
| TMA   | = | trimellitic anhydride          |
| THEIC | = | tris(hydroxyethyl)isocyanurate |
| NMP   | = | N-methyl pyrrolidone           |
| MDA   | = | 4,4'-methylene dianiline       |
| TPT   | = | tetraisopropyl titanate        |

EXAMPLE 1

|                    | Grams |
|--------------------|-------|
| 1. methyl Carbitol | 472   |
| 2. ethylene glycol | 218   |
| 3. THEIC           | 850   |
| 4. TMA             | 548   |
| 5. MDA             | 282   |
| 6. TA              | 312   |
| 7. TA              | 312   |

Parts 1 through 4 were charged to a 5-liter flask equipped with an agitator, a thermometer and an air-cooled Snyder column connected to a distillation receiver. The temperature was increased to 230° F., parts 5 and 6 were added. The temperature was allowed to increase to 392° F. When 67 cc of distillate were collected, part 7 was loaded into the flask. The temperature was allowed to increase to 446° F. and after collecting 320 cc of distillate a sample of resin was withdrawn from the flask. The viscosity was found to be M ½ (Gardner-Holdt) measured at 30% solids in cresylic acid. 20 inches of vacuum was then applied to the flask with a gradual increase to 24 inches. Upon removing 100 cc of distillate under vacuum, the reaction product was discharged from the flask. The viscosity of the finished polymer was N ½ (G-H) measured at 30% solids in cresylic acid. In methyl Carbitol the viscosity was C ½ at 40% solids. The viscosity of the solid resin was 460 cps at 365° F. when measured with a Brookfield viscometer.

The molecular weight as determined with a vapor phase osmometer was 571 and the hydroxyl value was 155.

The modified polyester-imide formed was dissolved in a mixture of methyl Carbitol and water. 10.2 parts of the ester imide dissolved in 10.2 parts of an 80/20 (by volume) mixture of methyl Carbitol/water. The viscosity was a U and the solids were 44.9%. No adjustment in the pH of the system was needed nor were amine solubilizers necessary.

EXAMPLE 2

| | Grams |
|---|---|
| 1. The methyl Carbitol modified polyester-imide prepared in Example 1 | 480 |
| 2. Cresylic Acid | 178 |
| 3. Solvesso 100 | 158 |
| 4. C. P. Phenol | 115 |
| 5. Cresylic Acid | 30 |
| 6. Solvesso 100 | 80 |
| 7. C. P. Phenol | 94 |
| 8. X03-02 (Mondur SH dissolved in Cresylic Acid - Solvesso 100) | 106 |
| 9. P11-13 (m,p-cresol-formaldehyde resin dissolved in Cresylic Acid - Solvesso 100) | 48 |
| 10. TPT | 17 |
| 11. Cresylic Acid | 17 |

A solution of the polymer prepared in Example 1 was made by dissolving the resin in 2,3,4 and holding the mixture at 250° F. with agitation until it was dissolved. The solution was further diluted with 5,6 and 7 whereupon 8 and 9 were added. Ten and 11 were premixed and then added to the wire enamel mix. The mix was then heated to 250° F. and held for 2 hours. The viscosity of the resulting wire enamel was a P and the solids were determined to be 37.2%.

EXAMPLE 3

| | Grams |
|---|---|
| 1. The methyl Carbitol modified polyester-imide prepared in Example 1 | 750 |
| 2. Methyl Carbitol | 240 |
| 3. Solvesso N-150 | 240 |
| 4. Mondur SH | 63.6 |
| 5. Methyl Carbitol | 95.4 |
| 6. TPT | 17 |
| 7. Cresylic Acid | 17 |
| 8. N-methyl pyrrolidone | 60 |

The polyester-imide resin made in Example 1 was dissolved in a solvent system consisting primarily of methyl Carbitol and Solvesso N-150 as can be seen from the above-formulation.

The resin was dissolved in 2 and 3 at 250° F. with agitation. Part 4 was predissolved in 5 and the TPT was stabilized with an equal amount of cresylic acid and then added. The solution was heated to 250° F. and maintained with agitation for two hours whereupon part 8 was added. The resulting wire enamel had a viscosity of Y ½ (G-H) at 49% solids.

EXAMPLE 4

| | Grams |
|---|---|
| 1. The methyl Carbitol modified polyester-imide prepared in Example 1 | 375 |
| 2. Methyl Carbitol | 120 |
| 3. Solvesso 150 | 120 |
| 4. Mondur SH | 35 |
| 5. Methyl Carbitol | 52.5 |
| 6. TPT | 10 |
| 7. Cresylic Acid | 10 |
| 8. NMP | 15 |

A wire enamel coating solution was made using the above-formulation and the procedure as in Example 3. The viscosity of the resulting solution was an X (Gardner-Holdt) at 49.4% solids.

EXAMPLE 5

| | Grams |
|---|---|
| 1. The methyl Carbitol modified polyester-imide prepared in Example 1 | 750 |
| 2. Methyl Carbitol | 240 |
| 3. Ethyl Alcohol | 240 |
| 4. Mondur SH | 70 |
| 5. Methyl Carbitol | 105 |
| 6. TPT | 17 |
| 7. Cresylic Acid | 17 |
| 8. Ethylene Glycol | 30 |
| 9. N-Methyl Pyrrolidone | 30 |

The polyester-imide made in Example 1 was dissolved in a solvent comprised primarily of ethyl alcohol and methyl Carbitol. The solution suitable for the coating of magnet wire was made by dissolving the ester imide according to the procedure of Example 2. The temperature of the mixing was adjusted to 180°-200° F. as the ethanol boiled above this temperature.

Examples 6 and 7 illustrate the inability of two other glycol ethers, Cellosolve (2 ethoxy ethanol) and methyl Cellosolve (2-methoxy ethanol) to impart polymer solubility and stability.

EXAMPLE 6

353 grams of Cellosolve were used in place of the methyl Carbitol in Example 1 and the same procedure followed as in that Example. After the collection of 500 cc of distillate and obtaining a temperature of 446° F. the reaction mixture was still cloudy. The theoretical amount of water available based on the charge was 238 cc. While still cloudy, the batch gelled.

EXAMPLE 7

300 grams of methyl Cellosolve were used in place of methyl Carbitol in Example 1. Following the same procedure the reaction was still cloudy after collecting 486 cc of distillate. Upon obtaining a sample viscosity of V ½ (Gardner-Holdt) at 30% in cresylic acid the batch gelled while still containing unreacted terephthalic acid.

EXAMPLE 8

| | Grams |
|---|---|
| 1. Neopentyl Glycol | 73 |
| 2. Ethylene Glycol | 397 |
| 3. THEIC | 1075 |
| 4. TMA | 712 |
| 5. MDA | 367 |
| 6. TA | 811 |

A polyester-imide was made with a hydroxyl/carboxyl ratio of 2/1.

Parts 1 through 5 were loaded into a 5-liter flask. The mixture was heated to 220° F. and 6 added. The batch was heated to 460° F. and after obtaining 320 cc of distillate, the batch was clear and had a sample viscosity of T (Gardner-Holdt) at 30% solids measured in cresylic acid. The distillation column was removed and 20 to 22 inches of vacuum were applied at 380° to 410° F. whereupon 34 cc of distillate were obtained.

EXAMPLE 9

The polyester-imide of Example 8 was dissolved in a methyl Carbitol and Solvesso 150 mixture using the procedure of Example 3.

The polyester-imide was soluble in the methyl Carbitol but upon addition of the hydrocarbon diluent it became cloudy and the N-methyl pyrrolidone added was needed to maintain clarity. Upon standing for several weeks the wire enamel became cloudy in contrast to the polyester-imide into which the methyl Carbitol is coreacted.

|  | Grams |
| --- | --- |
| 1. Polyester-imide of Example 8 | 375 |
| 2. Methyl Carbitol | 120 |
| 3. Solvesso 150 | 120 |
| 4. Mondur SH | 32 |
| 5. Methyl Carbitol | 48 |
| 6. TPT | 8.5 |
| 7. Cresylic Acid | 8.5 |
| 8. Methyl Carbitol | 50 |
| 9. Solvesso 150 | 50 |
| 10. N-Methyl Pyrrolidone | 60 |

The resulting viscosity was a V at 45% solids.

EXAMPLE 10

This Example illustrates a polyester-imide useful as a wire coating when applied from solvent using conventional application techniques. It also can be applied as a hot melt using a heated applicator.

OH/COOH = 1.81/1.0, 21.5% imide, 6.1% methyl Carbitol based on the total equivalents charged, 10.5% of the hydroxyl equivalents present as methyl Carbitol.

|  | Grams |
| --- | --- |
| 1. Methyl Carbitol | 212.8 |
| 2. Ethylene Glycol | 197.4 |
| 3. THEIC | 765 |
| 4. TMA | 493 |
| 5. MDA | 253 |
| 6. Zinc Acetate | 1.31 |
| 7. DMT | 655 |
| 8. Xylene | 150 |

The above reactants were loaded into a flask equipped with a Snyder column, agitator and thermometer. The temperature was increased to 180° C. within two hours whereupon 72 cc of distillate were obtained. The temperature was allowed to increase to 210° C. Upon obtaining 342 cc of distillate the distillation under atmospheric conditions was complete. A vacuum was applied and 64 additional cc were obtained at a temperature of 200° C. whereupon the distillation again ceased.

EXAMPLE 10-A

A wire enamel solution was made by dissolving 650 parts of the polyester-imide made in Example 10 in 67 parts of methyl Carbitol and 77 parts of Solvesso 150 at 120° C. At 60° C., 136.5 parts of a 40% solution of Mondur SH in methyl Carbitol was added followed by 14.3 parts of TPT premixed with 10 parts of methyl Carbitol. The solution was held at 125° C. for 3 hours and diluted with 52 parts of NMP and 218 parts of a methyl Carbitol/Solvesso solids by volume. The properties when coated and baked onto 18 gauge copper wire were good.

The stack loss of the wire enamel was determined with the aid of TiO$_2$. The average retention was found to be 91.97% resulting in a stack loss of 8.03% and effective solids of 46.26%. The stack losses of a commercial polyester-imide ISOMID ® made without methyl Carbitol had an unexpectantly higher stack loss of 10.25%.

EXAMPLE 10-B 1250 parts of the polyester-imide made in Example 10 were crushed and loaded into a 3 liter flask. 37 parts of ethylene glycol were added and the contents heated to 150° C. and melted with agitation. At 122° C., 300 parts of a 40% solution of Mondur SR in cresylic acid were added along with 87 parts of tetra phenyl titanate. The reaction was held at 150° C. for 2 hours.

When applied onto copper wire in four passes using an applicator heated to 180° C., a smooth coating was obtained with acceptable mechanical properties.

EXAMPLE 10-C 1000 parts of the polyester-imide made in Example 10 were processed and applied to 18 gauge copper wire as in 10-B using 30 parts of ethylene glycol, 240 parts of Mondur SH dissolved in methyl Carbitol and 70 parts of tetra phenyl titanate.

EXAMPLE 11

287 grams of butyl Carbitol were added in place of the methyl Carbitol in Example 10-A. The polyester-imide was processed as in Example 10 and the resulting product compounded into a wire enamel using a 50:50 butyl Carbitol/Solvesso 150 solvent blend (by volume). The wire enamel was coated onto copper wire with good results. The viscosity was a U at 50% solids.

In place of the 50:50 butyl Carbitol/Solvesso 150 solvent blend there can also be used 100% butyl Carbitol as the solvent to give a product having 50% solids.

EXAMPLE 12

237.5 grams of ethyl Carbitol were used in place of the methyl Carbitol in Example 10. The resulting product was compounded into a wire enamel as in Example 10-A using a 50:50 butyl Carbitol/Solvesso 150 solvent blend in place of the methyl Carbitol/Solvesso and coated onto 18 gauge copper wire. The viscosity was a Y at 50% solids.

In place of butyl Carbitol/Solvesso 150 there can be used 100% butyl Carbitol as the solvent. Also there can be used a mixture of ethyl Carbitol and butyl Carbitol as the solvent, e.g., 50:50 by volume.

EXAMPLE 13

| Reactant | Batch Weight, Grams |
| --- | --- |
| 1. Propasol Solvent DM (Dipropylene glycol monomethyl ether) | 262 |
| 2. Ethylene Glycol | 197 |
| 3. Tris-2-(Hydroxyethyl) Isocyanurate | 765 |
| 4. Trimellitic Anhydride | 493 |
| 5. Methylene Dianiline | 253 |
| 6. Zinc Acetate | 1.31 |
| 7. Dimethyl Terephthalate | 655 |
| 8. Xylol | 150 ml. |

Parts 1, 2, 3, 4, 5, 6 and 8 were charged into a three-liter reaction kettle equipped with a Snyder Column, Dean Stark, condenser, thermometer and agitator. The batch was heated to 120° C. whereupon part 7 was loaded. Over a 2 hour period the temperature was increased to 185° C. The reaction mixture was then allowed to cool to 125° C. overnight and reheated to 200° C. the following day. The reaction was held for one hour at 200° C. then allowed to rise 10° C. to 210° C. in 1 hour after which 270 cc of distillate were obtained. The batch was then vacuum stripped under 22 inches of mercury vacuum for 10 minutes, accompanied by an additional 34 cc of distillate. The final viscosity measured in cresylic acid was J-K (Gardner-Holdt) at 30 percent solids. The reaction mixture was insoluble at 30 percent solids in propasol solvent DM. However, it was soluble at 30 percent solids in methyl Carbitol with a viscosity of leas than A.

EXAMPLE 13-A

| Reactant | Batch Weight, Grams |
|---|---|
| 1. Polyester-Imide of Example 13 | 650 |
| 2. Methyl Carbitol | 66.9 |
| 3. Solvesso 150 | 76.9 |
| 4. Mondur SH at 40 percent solids in Methyl Carbitol | 135.5 |
| 5. Tetra isopropyl Titanate | 14.3 |
| 6. Methyl Carbitol | 109 |
| 7. Solvesso 150 | 109 |
| 8. N-methyl-2-pyrrolidone | 52 |

Parts 1, 2, 3 were charged into a three-liter reaction kettle equipped with an agitator, condensor and thermometer. The batch was heated until 1 was dissolved at 140° C. The reaction mixture was then cooled to 60° C. where 4 and 5 were added. The mixture was then heated to 120° C. and held for two hours. When the heat was turned off, 6 and 7 were added, the batch was then sampled for viscosity. This sample remained clear and had a viscosity of Z2. The N-methyl-2-pyrrolidone (8) was then added. The viscosity of the batch was then determined to be X three-fourths on the Gardner-Holdt scale at 50% solids.

This enamel coated 18 AWG copper wire at 45 FPM (feet per minute) with an appearance rating of 3. The average cut through temperature was 349° C. and there were heat shocks of 0, 40, 90, 100 at the 1, 2, 3 and 4 times mandrels when tested for one half hour at 200° C. with a 20 percent prestretch of the wire.

EXAMPLE 14

This Example is a class F polyester-imide resin utilizing trimethylolpropane as the triol in place of glycerine. Again, methyl Carbitol represents 10% of the total hydroxyl equivalents.

| | Grams |
|---|---|
| 1. Methyl Carbitol | 187 |
| 2. Ethylene Glycol | 207 |
| 3. TMP | 327 |
| 4. TMA | 411 |
| 5. MDA | 212 |
| 6. TA | 234 |
| 7. TA | 234 |
| 8. Dibutyl tin oxide | 1.4 |

Parts 1-5 and 8 were loaded into a flask equipped with a Synder column, Dean Stock trap, condenser, thermometer and agitator. Heat was added and at 230° F., part 6 was added. The heat was increased to 320° F. when part 7 was added. Distillate was already being obtained at this time. The temperature was allowed to increase over a 4 hour period to 420°–440° F. where the temperature was held until the reaction went to completion. At completion, 180 cc of distillate was obtained. The resulting resin was soft and pliable.

The above resin was then made into a wire enamel.

EXAMPLE 14-A

| | Grams |
|---|---|
| 1. Polyester-imide resin made in Example 14 | 375 |
| 2. Methyl Carbitol | 120 |
| 3. Solvesso 150 | 120 |
| 4. Mondur SH | 32 |
| 5. Methyl Carbitol | 48 |
| 6. TPT | 8.5 |
| 7. Methyl Carbitol | 8.5 |
| 8. Ethylene Glycol | 17 |

Parts 1-3 were loaded to a flask equipped with condenser, thermometer and agitator. The heat was increased to 250° F. until the resin dissolved. The heat was then removed and the mix allowed to cool. At 220° F. part 4 predissolved in 5 was added. At 130°-140° F, part 6 premixed with part 7 was added. Heat was then applied until the temperature reached 250° F. where it was held for a period of 2 hours. At the end of the 2 hours, the ethylene glycol was added. The resulting mix had a viscosity of W- at 47.4% solids. When run at 45 ft/min on 18 gauge copper wire, the runnability was a 3, the mandrel after snap was 3X's, the abrasion resistance was 1225–1525 grams, the average cut through temperature was 308° C. Heat shocks of 0, 50, 60, 90% at 1, 2, 3 and 3X's mandrel were obtained, when tested at 175° C. for ½ hours with a 20% prestretch of the wire.

EXAMPLE 15

This illustrates a Class F polyester-imide utilizing another glycol ether in place of the methyl Carbitol. The glycol ether used was Dowanol TPM(tripropylene glycol monomethyl ether). The Dowanol TPM comprised 10% of the total hydroxyl equivalent.

| | Grams |
|---|---|
| 1. Dowanol TPM | 322 |
| 2. Ethylene Glycol | 207 |
| 3. Glycerine | 224 |
| 4. TMA | 411 |
| 5. MDA | 212 |
| 6. TA | 234 |
| 7. TA | 234 |
| 8. Dibutyl tin oxide | 1.4 |

Parts 1-4 and 8 were loaded into a flask equipped with a Snyder column, Dean Stark trap, condenser, agitator and thermometer. Heat was added and at 230° F. part 5 was added. The procedure following the addition was the same as in Example 14. The resulting resin was soft and pliable and was soluble in methyl Carbitol.

EXAMPLE 15-A

The resin of Example 15 was then made into wire enamel coating solution.

| | Grams |
|---|---|
| 1. Polyester-imide resin made in Example 15 | 375 |
| 2. Methyl Carbitol | 120 |
| 3. Solvesso 150 | 120 |
| 4. Mondur SH | 32 |
| 5. Methyl Carbitol | 48 |
| 6. TPT | 8.5 |
| 7. Methyl Carbitol | 8.5 |
| 8. Ethylene Glycol | 17 |

The procedure for this enamel was identical to the one in Example 14.

The resulting enamel had a viscosity of V at 44.7% solids. It was coated at 45 ft/min onto 18 gauge copper wire and had a runnability of 3, a 2X's mandrel after snap, abrasion resistance of 1325-1466 grams and a cut through temperature of 246° C.

EXAMPLE 16

This illustrates a polyester-imide where the difunctional glycol was completely deleted from the formula and where the methyl Carbitol was 41% of the total hydroxyl equivalents.

|   | Grams |
|---|---|
| 1. Methyl Carbitol | 252 |
| 2. THEIC | 261 |
| 3. TMA | 384 |
| 4. MDA | 198 |
| 5. TA | 166 |
| 6. Dibutyl tin oxide (catalyst) | .5 |

Parts 1-4 and 6 were loaded into a flask equipped with a Snyder Column, Dean Stark trap, condenser, agitator and thermometer. Heat was applied and the temperature allowed to rise over a 2 hour period to 330° F., whereupon part 5 was added. The temperature increased over a 5 hour period to 460° F., by which time the batch had cleared and most of the distillate was obtained. The batch was then allowed to cool overnight. The next day the temperature was again allowed to rise to 464° F. over a 1 ¾ hour period at which time additional distillate could not be obtained. The total distillate obtained was 100 cc. The final product was a clear hard resin soluble in methyl Carbitol and which had a viscosity of R-S measured at 30% solids in cresylic acid.

EXAMPLE 16-A

The resin of Example 16 was then processed into a wire enamel coating solution.

|   | Grams |
|---|---|
| 1. Polyester-imide resin of Example 16 | 375 |
| 2. Methyl Carbitol | 120 |
| 3. Solvesso 150 | 120 |
| 4. Mondur SH | 32 |
| 5. Methyl Carbitol | 48 |
| 6. TPT | 8.5 |
| 7. Methyl Carbitol | 8.5 |
| 8. Ethylene Glycol | 17 |
| 9. Methyl Carbitol | 50 |
| 10. Solvesso 150 | 50 |

The procedure for this enamel was identical to that of Example 14A, except that this mix contained parts 9 and 10 which adjusted the viscosity to a Y ½ at 43.9% solids.

When run on 18 gauge copper wire at 45 ft/min, the enamel had a runnability of 3, a 1X's mandrel after snap, an abrasion resistance of 1375-1483 grams, and a cut through temperature of 260° C.

EXAMPLE 17

| Reactant | Batch Weight, Grams |
|---|---|
| 1. Phenyl Glycol Ethers* | 132.5 |
| 2. Ethylene Glycol | 98.7 |
| 3. Tris-(2-Hydroxy ethyl) isocyanurate | 382.5 |
| 4. Trimellitic Anhydride | 246.5 |

-continued

| Reactant | Batch Weight, Grams |
|---|---|
| 5. Methylene Dianiline | 126.5 |
| 6. Zinc Acetate | .66 |
| 7. Dimethyl Terephthalate | 327.5 |
| 8. Xylol | 150 |

*Phenyl Glycol Ethers are a blend of 70 percent ethylene glycol monophenyl ether and 30 percent diethylene glycol monophenyl ether as obtained from Union Carbide.

The reaction was carried out as described in Example 13 with a total of 204 cc of distillate obtained. The final viscosity at 30 percent solids in cresylic acid was P to O on the Gardner-Holdt scale. The same check cut using methyl Carbitol as the solvent gave a viscosity of less than A.

EXAMPLE 17-A

A wire enamel mix similar to Example 13-A was then prepared from the above polyester-imide. The viscosity at 50 percent solids however was a Z1. Therefore 100 grams of additional solvent was added, 50 grams of methyl Carbitol and 50 grams of Solvesso 150. The final viscosity was X one-fourth on the Gardner-Holdt scale at 48 percent solids.

EXAMPLE 18

This illustrates the use of methoxytriglycol (triethylene glycol monomethyl ether) in place of methyl Carbitol. The methoxy triglycol represented 10% of the total hydroxyl equivalents.

|   | Grams |
|---|---|
| 1. Methoxytriglycol | 166 |
| 2. Ethylene Glycol | 135 |
| 3. THEIC | 414 |
| 4. TMA | 267 |
| 5. MDA | 138 |
| 6. TA | 152 |
| 7. TA | 152 |
| 8. Dibutyl tin oxide | .9 |

The procedure was the same as that of Example 4.

EXAMPLE 18-A

The resulting resin was then made into an enamel.

|   | Grams |
|---|---|
| 1. Polyester-imide resin of Example 18 | 375 |
| 2. Methyl Carbitol | 120 |
| 3. Solvesso 150 | 120 |
| 4. Mondur SH | 32 |
| 5. Methyl Carbitol | 48 |
| 6. TPT | 8.5 |
| 7. Methyl Carbitol | 8.5 |
| 8. Ethylene Glycol | 14 |

The procedure for this enamel was the same as that of Example 14-A. The finished enamel had a viscosity of Y- at 49.3% solids.

The percent solids of the wire enamel solutions were determined using two gram samples in a forced air oven held at 200° C. for two hours. The cut through values in the present invention were determined using a 2000 gram weight. These conditions are more stringent than using a 600 gram weight as in the aforementioned Okada Japanese published application.

The heat shock testing at 175° C. and 200° C. is also more severe than the testing at 150° C. as in Okada.

One of the advantages of being able to make higher solids wire enamels makes it possible to reduce the number of passes required to build up the thickness of the coating on the wire.

The glycol ether modified polyester-imides of the present invention are also useful in hot melt application to the wire, e.g., at 85-88% using methyl Carbitol or cresylic acid.

The compositions can comprise, consist essentially of or consist of the materials set forth.

The following table shows the properties with 18 gauge copper wire coated with the compositions of some of the examples described above.

| Example | Wire Speed Ft/min | Appearance | Mandrel After Snap | Cut THrough °C | 1X | 2X | 3X | 4X |
|---|---|---|---|---|---|---|---|---|
| 2 | 45 | 3 | 1X | 360 | 80* | 100 | 100 | 100 |
| 3 | 45 | 3 | 1X | 366 | 0* | 20 | 90 | 100 |
| 4 | 45 | 3 | 1X | 355 | 10* | 40 | 70 | 100 |
| 5 | 40 | 3 | 2X | 364 | 20* | 80 | 100 | 100 |
| 9 | 45 | 3 | 1X | 341 | 50* | 80 | 100 | 100 |
| 10-A | 45 | 3 | 2X | 366 | 10* | 60 | 100 | 100 |
| 10-B | 40 | 3 | 2X | 350 | 20* | 90 | 90 | 100 |
|  | 45 | 2-3 | 1X | 358 | 10* | 80 | 90 | 100 |
| 10-C | 40 | 3 | 2X | 348 | 50* | 90 | 100 | 100 |
|  | 45 | 2-3 | 1X | 348 | 60* | 80 | 90 | 90 |
| 11 | 45 | 3 | 3X | 350 | 40** | 80 | 100 | 100 |
| 12 | 45 | 3 | 2X | 352 | 20** | 80 | 100 | 100 |
| 17-A | 45 | 2 | 1X | 359 | 60** | 90 | 100 | 100 |
| 18-A | 45 | 3 | 1X | 351 | 30** | 90 | 100 | 100 |

*Heat shock tested at 200° C for ½ hour at 20% prestretch (percent pass)
**Heat shock tested at 175° C for ½ hour at 20% prestretch (percent pass)

In the claims when reference is made to the reaction product of terephthalic acid or isophthalic acid, it should be understood that the term is intended to cover the product whether the carboxylic acid component is added as the free acid or as an ester thereof, e.g., dimethyl terephthalate, which splits off an alcohol in the reaction. When the term "free acid" is used in the claims, then the term is limited to reacting the acid as such, e.g., terephthalic acid, and does not cover the use of the esters, e.g., dimetyl terephthalate.

The polyester-polyimide can be used not only as an insulating coating for wires but also to coat electrical conductors in other forms, e.g., sheet metal such as copper, silver or aluminum sheets.

What is claimed is:

1. A solution in a solvent comprising at least 40% of a glycol ether which is a monoalkyl ether of diethylene glycol having 1 to 4 carbon atoms, phenoxy ethanol or the monophenyl ether of ethylene glycol of a polyester-polyimide having a hydroxy to carboxyl ratio of 1.25:1 to 2:1, 96 to 50% ester groups, 5 to 50% imide groups, the polyimide being an imide of reactants comprising an aromatic diamine and trimellitic anhydride, the polyester being an ester of isophthalic acid or terephthalic acid or benzophenone dicarboxylic acid with up to 10% of an alkane dicarboxylic acid having 6 to 10 carbon atoms with alcohols wherein 5 to 45% of the hydroxyl groups are contributed by (I) an etheralcohol which either (a) has the formula $$RO(C_nH_{2n}O)_xH$$

where R is an alkyl group of 1 to 4 carbon atoms or phenyl, n is 2 or 3 and x is 2 or 3 or (b) is the monophenyl ether of ethylene glycol, (II) at least 20% of the hydroxyl group are contributed by a trihydric alcohol which is tris(2-hydroxyethyl)cyanurate, glycerine, trimethylolpropane or trimethylolethane and (III) any balance of hydroxyl groups are contributed by a dihydric alcohol, said polyester-polyimide having a sufficiently low molecular weight that it is soluble in said solvent.

2. A solution in a solvent comprising at least 40% of a glycol ether which is a monoalkyl ether of diethylene glycol having 1 to 4 carbon atoms, phenoxyethanol or the monophenyl ether of diethylene glycol of a polyester-polyimide having a hydroxy to carboxyl ratio of 1.25:1 to 2:1, 95 to 50% ester groups, 5 to 50% imide groups, the polyimide being an imide of reactants comprising a diamine and trimetallitic anhydride, the polyester being an ester of isophthalic acid or terephthalic acid or benzophenone dicarboxylic acid with up to 10% of an alkane dicarboxylic acid having 6 to 10 carbon atoms with alcohols wherein 5 to 45% of the hydroxyl groups are contributed by (I) an ether-alcohol which either (a) has the formula $$RO(C_nH_{2n}O)_xH$$

where R is an alkyl group of 1 to 6 carbon atoms or phenyl, n is 2 or 3 and x is 2 or 3 or (b) is the monophenyl ether of ethylene glycol, (II) at least 20% of the hydroxyl group are contributed by a trihydric alcohol and (III) any balance of hydroxyl groups are contributed by a dihydric alcohol, said polyester-polyimide having a sufficiently low molecular weight that it is soluble in a mono lower alkyl ether of diethylene glycol or in the monophenyl ether of diethylene glycol or phenoxyethanol or a mixture of said phenyl ethers.

3. A solution according to claim 1 wherein (II) contributes at least 30% of the hydroxyl groups and the hydroxy to carboxyl ratio is 1.8:1 to 2:1.

4. A solution according to claim 1 wherein the solvent is at least 50% of said glycol ether.

5. A solution according to claim 4 wherein the solvent is 100% of said glycol ether, said monoalkyl ether having 1 to 2 carbon atoms in the alkyl group.

6. A solution according to claim 1 wherein the solvent is a mixture consisting essentially of said glycol ether and a hydrocarbon.

7. A solution according to claim 6 wherein the hydrocarbon is an aromatic hydrocarbon.

8. A solution according to claim 1 wherein the solvent includes at least 40% of a mixture of phenoxyethanol and phenoxyethoxyethanol and (I) is a mixture of phenoxyethanol and phenoxyethoxyethanol.

9. A solution according to claim 1 wherein the solvent includes at least 40% of a mono 1 to 4 carbon atom alkyl ether of diethylene glycol.

10. A solution according to claim 9 containing at least 30% of said polyester-polyimide wherein R is butyl and (I) is (a) and the glycol ether consists of butoxyethoxyethanol.

11. A solution according to claim 10 containing 45 to 55% of said polyester-polyimide.

12. A solution according to claim 9 wherein the solvent includes at least 40% of methoxyethoxyethanol and the solution contains at least 30% of said polyester-polyimide.

13. A solution according to claim 12 wherein the sole glycol ether present as a solvent is methoxyethoxyethanol.

14. A solution according to claim 12 wherein the glycol ether is a mixture of methoxyethoxyethanol and ethoxyethoxyethanol.

15. A solution according to claim 14 wherein R is ethyl and (I) is (a).

16. A solution according to claim 12 wherein R is methyl and (I) is (a).

17. A solution according to claim 16 containing 45 to 55% of said polyester-polyimide.

18. A solution according to claim 1 wherein any dihydric alcohol present is an alkane diol having 2 to 8 carbon atoms.

19. A solution according to claim 18 wherein the diamine is methylene dianiline, tolylene diamine or oxydianiline.

20. A solution according to claim 19 wherein the diamine is methylene dianiline, the dicarboxylic acid is terephthalic acid.

21. A solution according to claim 20 wherein the polyester-polyimide has a molecular weight of 550 to 1200.

22. A solution according to claim 20 wherein (I) is methoxyethoxyethanol, ethoxyethoxyethanol, butoxyethoxyethanol, methoxypropoxypropanol, methoxypropoxypropoxypropanol, phenoxyethanol or phenoxyethoxyethanol.

23. A solution according to claim 22 wherein the trihydric alcohol is tris(2-hydroxyethyl) isocyanurate.

24. A solution according to claim 23 which has no component (III) in the polyester-polyimide.

25. A solution according to claim 23 wherein component (III) is present in the polyester-polyimide in an amount of at least 10% and is ethylene glycol.

26. A solution according to claim 22 wherein the tihydric alcohol in the polyester-polyimide is glycerine or trimethylol propane.

27. A solution according to claim 22 wherein (I) is methoxyethoxyethanol.

28. A solution according to claim 27 wherein 5 to 30% of the hydroxyl groups are contributed by (I).

29. A solution according to claim 28 wherein 5 to 12% of the hydroxyl groups are contributed by (I).

30. A solution according to claim 19 wherein 5 to 30% of the hydroxyl groups are contributed by (I).

* * * * *